(12) United States Patent
Chaddha

(10) Patent No.: US 6,266,817 B1
(45) Date of Patent: *Jul. 24, 2001

(54) DECODER FOR A SOFTWARE-IMPLEMENTED END-TO-END SCALABLE VIDEO DELIVERY SYSTEM

(75) Inventor: Navid Chaddha, Stanford, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/062,879

(22) Filed: Apr. 20, 1998

Related U.S. Application Data (63) Continuation of application No. 08/424,703, filed on Apr. 18, 1995, now Pat. No. 5,742,892.

(51) Int. Cl.$^7$ .............................. H04N 7/16; H04N 7/12; H04N 11/02; H04N 11/04; H04B 1/66

(52) U.S. Cl. ............... 725/146; 375/240.11; 375/240.22; 348/413.1; 348/402.01; 348/403.01

(58) Field of Search .............................. 345/327; 458/5.1; 348/400, 398, 416, 417, 422, 413.01, 402.01, 403.01; 375/240.11, 240.22, 240.03, 240.2; H04N 7/12, 11/02, 11/04, 7/16; H04B 1/66

(56) References Cited

U.S. PATENT DOCUMENTS

| | | |
|---|---|---|
| 4,710,812 | 12/1987 | Murakami . |
| 5,168,356 | 12/1992 | Acampara . |
| 5,225,904 | 7/1993 | Goulin . |
| 5,309,526 | 5/1994 | Pappas . |
| 5,388,181 | 2/1995 | Anderson . |
| 5,450,599 | 9/1995 | Horvath . |
| 5,508,746 | 4/1996 | Lim . |
| 5,533,138 | 7/1996 | Kim et al. . |

*Primary Examiner*—Andrew Faile
*Assistant Examiner*—Vivek Srivastava
(74) *Attorney, Agent, or Firm*—Flehr Hohbach Test Albritton & Herbert LLP (57) ABSTRACT

A decoder is used in an end-to-end scalable video delivery system operable over heterogeneous networks. The decoder may software-based and computationally low complexity, or may be implemented inexpensively in ROM hardware. The system utilizes a scalable video compression algorithm based on a Laplacian pyramid decomposition to generate an embedded information stream. At the receiving end, the decoder extracts from the embedded stream different streams at different spatial and temporal resolutions. Decoding a 160×120 pixel image involves only decompressing a base layer 160×120 pixel image. Decoding a 320×240 pixel image involves decompressing and up-sampling (e.g., interpolating) the base layer to yield a 320×240 pixel image to which is added error data in a first enhancement layer following its decompression. To obtain a 640×480 pixel image, the decoder up-samples the up-sampled 320×240 pixel image, to which is added error data in a second enhancement layer, following its decompression. Because decoding requires only additions and look-ups from a table stored in a small (12 Kb) memory, decoding occurs in real-time. Subjective quality of the compressed images preferably is enhanced using perceptual distortion measures. The system also provides joint-source channel coding capability on heterogenous networks. The look-up table or codebook includes the inverse perceptual weighting (preprocessed) and the inverse transform (preprocessed). Decoding permits the codewords within the look-up table codebook to include preprocessed color conversion, dithering, color palletization, edge-enhancement, decimation, and interpolation.

20 Claims, 3 Drawing Sheets

DECODER FOR A SOFTWARE-IMPLEMENTED END-TO-END SCALABLE VIDEO DELIVERY SYSTEM

This application is a continuation of Ser. No. 08/424,703 field Apr. 18, 1995, U.S. Pat. No. 5,742,892.

FIELD OF THE INVENTION

The present invention relates generally to client decoders for use with video delivery systems, and more specifically to client decoders for use in video delivery systems in which video may be delivered scalably, so as to maximize use of network resources and to minimize user-contention conflicts.

BACKGROUND OF THE INVENTION

It is known in the art to use server-client networks to provide video to end users, wherein the server issues a separate video stream for each individual client.

A library of video sources is maintained at the server end. Chosen video selections are signal processed by a server encoder stored on digital media, and are then transmitted over a variety of networks, perhaps on an basis that allows a remote viewer to interact with the video. The video may be stored on media that includes magnetic disk, CD-ROM, and the stored information can include video, speech, and images. As such, the source video information may have been stored in one of several spatial resolutions (e.g., 160×120, 320×240, 640×480 pixels), and temporal resolutions (e.g., 1 to 30 frames per second). The source video may present bandwidths whose dynamic range can vary from 10 Kbps to 10 Mbps. The signal processed video is transmitted to the clients (or decoders) over one or more delivery networks that may be heterogeneous, e.g., have widely differing bandwidths. For example, telephone delivery lines can transmit at only a few tens of Kbps, an ISDN network can handle 128 Kbps, ethernet at 10 Mbps, whereas ATM networks handle even higher transmission rates.

Although the source video has varying characteristics, prior art video delivery systems operate with a system bandwidth that is static or fixed. Although such system bandwidths are fixed, in practice, the general purpose computing environment associated with the systems are dynamic, and variations in the networks can also exist. These variations can arise from the outright lack of resources (e.g., limited network bandwidth and processor cycles), contention for available resources due to congestion, or a user's unwillingness to allocate needed resources to the task.

Prior art systems tend to be very computationally intensive, especially with respect to decoding images of differing resolutions. An encoder may transmit a bit stream of, say, 320×240 pixel resolution, whereas the decoder requires 160×120 pixel resolution. Decoding, in the prior art, requires that several processes be invoked, including decompression, entropy coding, quantization, discrete cosine transformation and down-sampling. Collectively, these process steps take too long to be accomplished in real-time.

Color conversions, e.g., YUV-to-RGB are especially computationally intensive, in the prior art. In another situation, an encoder may transmit 24 bits, representing 16 million colors, but a recipient decoder may be coupled to a PC having an 8 bit display, capable of only 256 colors. The decoder must then dither the incoming data, which is a computationally intensive task. Prior art decoders also take too long to complete operations such as color palletization to operate in real-time.

Unfortunately, fixed bandwidth prior art systems cannot make full use of such dynamic environments and system variations. The result is slower throughput and more severe contention for a given level of expenditure for system hardware and software. When congestion (e.g., a region of constrained bandwidth) is present on the network, packets of transmitted information will be randomly dropped, with the result that no useful information may be received by the client.

Video information is extremely storage intensive, and compression is necessary during storage and transmission. Although scalable compression would be beneficial, especially for browsing in multimedia video sources, existing compression systems do not provide desired properties for scalable compression. By scalable compression it is meant that a full dynamic range of spatial and temporal resolutions should be provided on a single embedded video stream that is output by the server over the network(s). Acceptable software-based scalable techniques are not found in the prior art. For example, the MPEG-2 compression standard offers limited extent scalability, but lacks sufficient dynamic range of bandwidth, is costly to implement in software, and uses variable length codes that require additional error correction support.

Further, prior art compression standards typically require dedicated hardware at the encoding end, e.g., an MPEG board for the MPEG compression standard. While some prior art encoding techniques are software-based and operate without dedicated hardware (other than a fast central processing unit), known software-based approaches are too computational intensive to operate in real-time. For example, JPEG software running on a Sparcstation 10 workstation can handle only 2–3 frames/second, e.g., about 1% of the frame/second capability of the present invention.

Considerable video server research in the prior art has focussed on scheduling policies for on-demand situations, admission control, and RAID issues. Prior art encoder operation typically is dependent upon the characteristics of the client decoders. Simply stated, relatively little work has been directed to video server systems operable over heterogeneous networks having differing bandwidth capabilities, where host decoders have various spatial and temporal resolutions.

In summary, there is a need for a video delivery system that provides end-to-end video encoding such that the server outputs a single embedded data stream from which decoders may extract video having different spatial resolutions, temporal resolutions and data rates. The resultant video compression would be bandwidth scalable and thus deliverable over heterogeneous networks whose transmission rates vary from perhaps 10 Kbps to 10 Mbps. Such a system should accommodate lower bandwidth links or congestion, and should permit the encoder to operate independently of decoder capability or requirements.

Preferably the decoder should be software-based (e.g., not require specialized dedicated hardware beyond a computing system) and should permit real-time decompression. Alternatively, the decoder should be implementable in hardware, using relatively inexpensive components. The system should permit user selection of a delivery bandwidth to choose the most appropriate point in spatial resolution, temporal resolution, data-rate and in quality space. The system should also provide subjective video quality enhancement, and should include error resilience to allow for communication errors.

The present invention provides such a decoder an end-to-end scalable video delivery system.

SUMMARY OF THE INVENTION

In a first embodiment, the present invention provides a software-based, rapidly operating decoder of low computational complexity for use with an end-to-end scalable video delivery system whose software-based server-encoder operates independently of the capabilities and requirements of the software-based decoder(s). The decoder operates in conjunction with a central processor unit ("CPU") and relies upon stored look-up tables containing preprocessed operations including color conversion, dithering, color palletization, interpolation, decimation, edge enhancement, and the like. In a second embodiment, the decoder functions are permanently stored in a read-only memory ("ROM") that operates in conjunction with a relatively simple central processor unit.

The encoder uses a scalable compression algorithm based upon Laplacian pyramid decomposition. An original 640×480 pixel image is decimated to produce a 320×240 pixel image that is itself decimated to yield a 160×120 pixel base image that is encoder-transmitted. This base image is then compressed to form a 160×120 pixel base layer that is decompressed and up-sampled to produce an up-sampled 320×240 pixel image. The up-sampled 320×240 pixel image is then subtracted from the 320×240 pixel image to provide an error image that is compressed as transmitted as a first enhancement layer. The 160×120 pixel decompressed image is also up-sampled to produce an up-sampled 640×480 pixel image that is subtracted from the original 640×480 pixel image to yield an error image that is compressed and transmitted as a second enhancement layer.

Collectively the base layer, and first and second enhancement layers comprise the single embedded bitstream that may be multicast over heterogeneous networks that can range from telephone lines to wireless transmission. Packets within the embedded bit-stream preferably are prioritized with bits arranged in order of visual importance. The resultant bit stream is easily rescaled by dropping less important bits, thus providing bandwidth scalability dynamic range from a few Kbps to many Mbps. Further, such embedded bit stream permits the server system to accommodate a plurality of users whose decoder systems have differing characteristics. The transmitting end also includes a market-based mechanism for resolving conflicts in providing an end-to-end scalable video delivery service to the user.

At the receiving end, the present invention comprises decoders, software-based or contained in ROM, of varying characteristics that extract different streams at different spatial and temporal resolutions from the single embedded bit stream. Decoding a 160×120 pixel image involves only decompressing the base layer 160×120 pixel image. Decoding a 320×240 pixel image involves decompressing and up-sampling (e.g., interpolating) the base layer to yield a 320×240 pixel image to which is added error data in the first enhancement layer following its decompression. To obtain a 640×480 pixel image, the decoder up-samples the up-sampled 320×240 pixel image, to which is added error data in the second enhancement layer, following its decompression.

Because decoding requires only additions and look-ups from a table stored in a small (12 Kb) memory, decoding occurs in real-time. Further, the decoder functions may be stored in a 12 Kb ROM that operates under control of a simple CPU. Subjective quality of the compressed images preferably is enhanced using perceptual distortion measures. The system also provides joint-source channel coding capability on heterogenous networks. The look-up table or codebook includes the inverse perceptual weighting (preprocessed) and the inverse transform (preprocessed). This permits decoding to involve merely a look-up operation and addition. Decoding according to the present invention permits the codewords within the look-up table or codebook to include preprocessed color conversion, dithering, color palletization, edge-enhancement, decimation, and interpolation.

Other features and advantages of the invention will appear from the following description in which the preferred embodiments have been set forth in detail, in conjunction with the accompanying drawings.

DETAILED DESCRIPTION OF THE PREFERRED EMBODIMENTS

Figure 1:
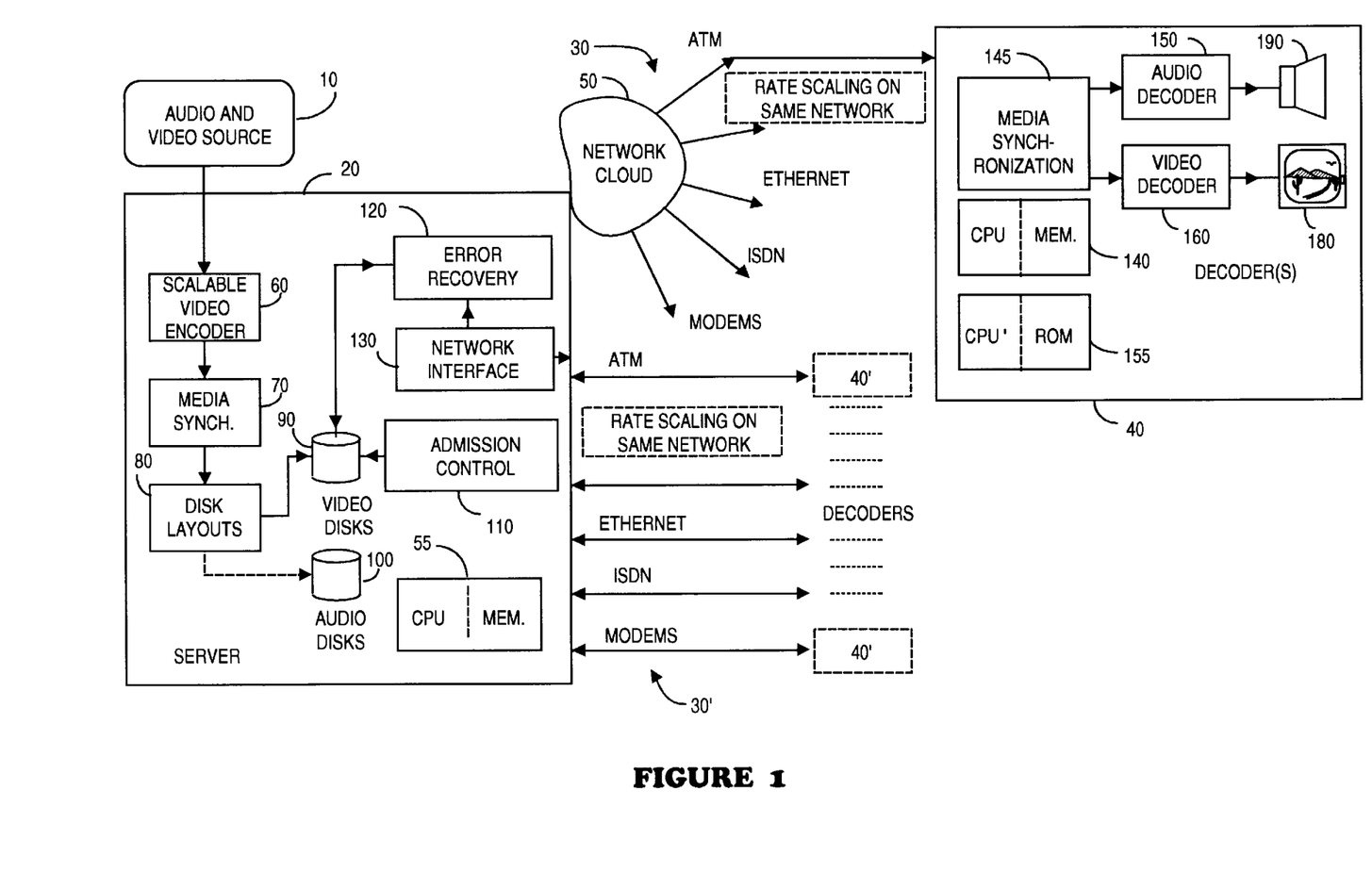
FIG. 1 is a block diagram of an end-to-end scalable video system, accord to the present invention.

FIG. 1 depicts an end-to-end scalable video delivery system including decoder(s) 40, 40' according to the present invention. Decoders 40, 40' may be software-based low computational complexity units, or may be implemented in hardware. A source of audio and video information 10 is coupled to a server or encoder 20. The encoder signal processes the information to produce a single embedded information stream that is transmitted via homogeneous networks 30, 30' to one or more target clients or software-based decoder systems 40, 40', which use minimal central processor unit resources. Network transmission may be through a so-called network cloud 50, from which the single embedded information stream is multicast to the decoders, or transmission to the decoders 40' may be point-to-point.

The networks are heterogeneous in that they have widely varying bandwidth characteristics, ranging from as low as perhaps 10 Kbps for telephones, to 100 Mbps or more for ATM networks. As will be described, the single embedded information stream is readily scaled, as needed, to accommodate a lower bandwidth network link or to adapt to network congestion.

Server 20 includes a central processor unit ("CPU") with associated memory, collectively 55, scalable video encoder 60, according to the present invention, a mechanism 70 for synchronizing audio, video and textual information, a mechanism 80 for arranging the information processed by the scalable video encoder onto video disks 90 (or other storage media). Storage 100 is also provided for signal processed audio information. Software comprising the scalable video encoder 60 preferably is digitally stored within server 20, for example, within the memory associated with CPU unit 55.

An admission control mechanism 110 is coupled to the processed video storage 90, as is a communication error recovery mechanism 120 for handling bit errors or packet cell loss. The decoder algorithm provides error resilience allowing for such communication errors. The server communicates with the heterogeneous network(s) through a network interface 130.

Scalable video encoder 60 preferably is implemented in software only (e.g., no dedicated hardware), and generates a single embedded information stream. Encoder 60 employs a new video coding algorithm based on a Laplacian pyramidal decomposition to generate the embedded information stream. (Laplacian pyramids are a form of compression known to those skilled in the art, and for that reason further details are not presented here.) The generated embedded stream allows server 20 to host decoders 40, 40' having various spatial and temporal resolutions, without the server having to know the characteristics of the recipient decoder (s).

Figure 2:
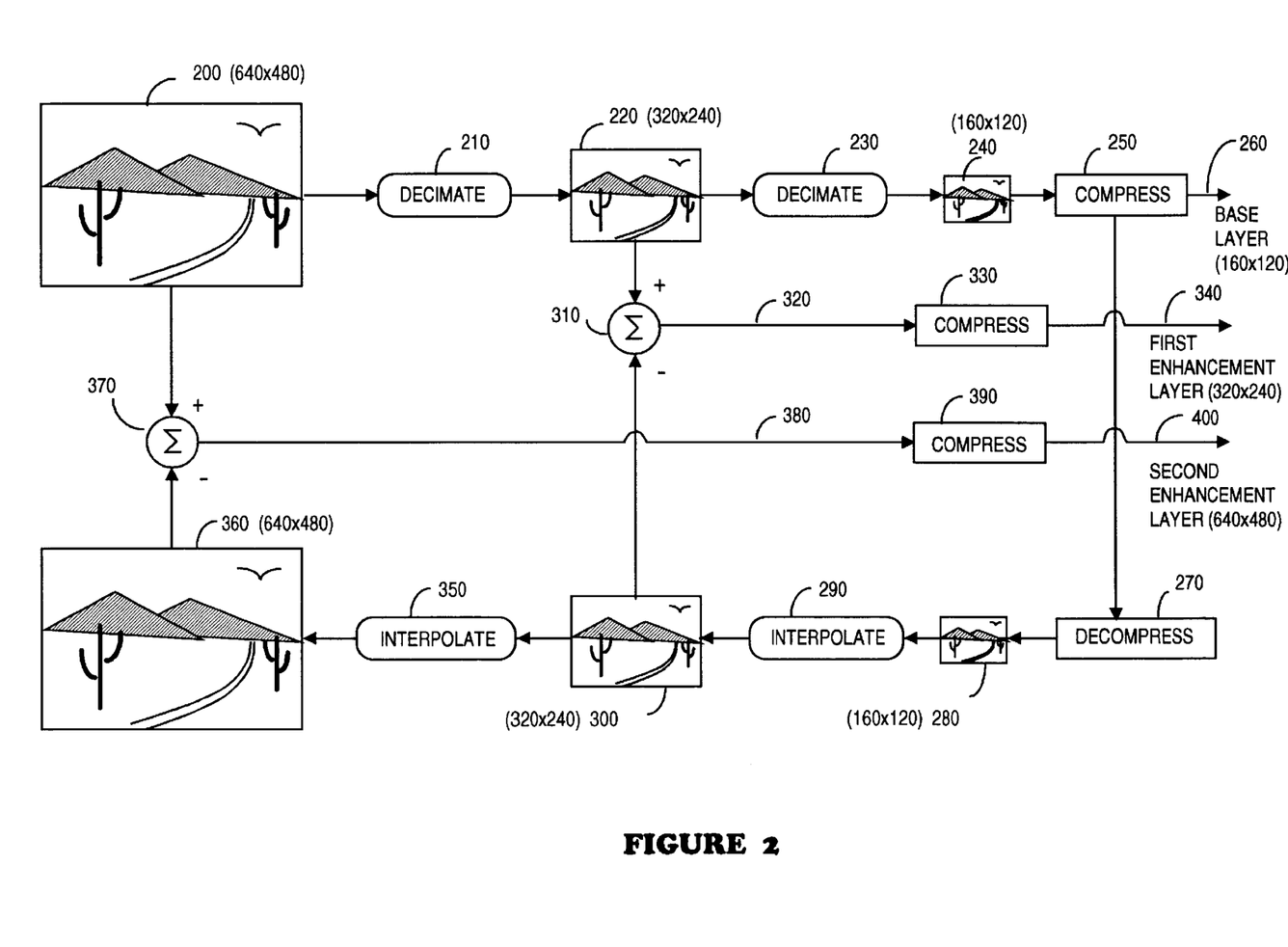
FIG. 2 is a block/flow diagram depicting a software-based encoding technique for generating a scalable embedded video stream, according to the present invention.

Encoding is shown in FIG. 2. In overview, the base layer is coding by doing a discrete cosine transform ("DCT") followed by perceptual weighting, followed by vector quantization. The base layer is coded and is interpolated to the next higher layer, where the error difference is taken with respect to the original image at that layer. The error is again coded using DCT followed by perceptual weighting, followed by vector quantization. The process is repeated for the next higher level image.

More specifically, as shown in FIG. 2, an original 640× 480 pixel image 200 from source 10 is coupled to the scalable video encoder 60. At process step 210, this image is decimated (e.g., filtered and sub-sampled) to 320×240 pixels (image 220), step 210, and at process step 230 image 220 is decimated to produce a base layer 160×120 pixel image 240 for encoding by encoder 60.

For the 160×120 pixel base layer, encoding preferably is done on a 2×2 blocks (e.g., two adjacent pixels on one line, and two adjacent pixels on a next line defining the block) with DCT followed by tree-structured vector quantization ("TSVQ") of the results of that transform. For the 320×240 first enhancement layer, encoding is done on 4×4 blocks, with DCT followed by TSVQ, and for the 640×480 pixel enhancement layer, encoding is done on 8×8 blocks, again with DCT followed by TSVQ.

At step 250, the 160×120 pixel base image 240 is compressed to form a 160×120 pixel base layer 260 and then at step 270 is decompressed. The resulting decompressed image 280 is up-sampled by interpolation step 290 to produce an up-sampled 320×240 pixel image 300.

At summation step 310, the up-sampled 320×240 pixel image 300 is subtracted from the 320×240 pixel image 220 to give an error image 320. At step 330 the error image 320 is compressed and then transmitted as a first enhancement 20 640×480 pixel layer 340.

The 160×120 pixel decompressed image 280 is also up-sampled at step 350 to produce an up-sampled 640×480 pixel image 360. At summation step 370, the up-sampled 640×480 pixel image 360 is subtracted from the original 640×480 pixel image 200 to yield an error image 380. At step 390, the error image 380 is compressed to yield a second enhancement 320×240 pixel layer 400 that is transmitted. Collectively, layers 260, 340 and 400 comprise the embedded bit-stream generated by the scalable video encoder 60.

Thus, it is appreciated from FIG. 2 that a scalable video encoder 60 according to the present invention encodes three image resolutions. The transmitted base layer 260 has compressed data for the compressed 160×120 pixel image 240. The first enhancement layer 340 has error data for the compressed 320×240 pixel image 220, and the second enhancement layer 400 has error data for the compressed 640×480 pixel image 200.

Thus, the present invention uses vector quantization across transform bands to embed coding to provide bandwidth scalability with an embedded bit stream. Vector quantization techniques are known in the art. See, for example, A. Gerso and R. M. Gray, "Vector Quantization and Signal Compression", Kluwer Academic Press, 1992.

Embedded coding and vector quantization may each be performed by tree-structured vector quantization methods e.g., by a successive approximation version of vector quantization ("VQ"). In ordinary VQ, the codewords lie in an unstructured codebook, and each input vector is mapped to the minimum distortion codeword. Thus, VQ induces a partition of a input space into Voronoi encoding regions.

By contrast, when using TSVQ, the codewords are arranged in a tree structure, and each input vector is successively mapped (from the root node) to the minimum distortion child node. As such, TSVQ induces a hierarchical partition, or refinement of the input space as three depth of the tree increases. Because of this successive refinement, an input vector mapping to a leaf node can be represented with high precision by the path map from the root to the leaf, or with lower precision by any prefix of the path.

TSVQ produces an embedded encoding of the data wherein if the depth of the tree is R and the vector dimension is k, bit rates O/k . . . , R/k can all be achieved. To achieve further compression, the index-planes can be run-length coded followed by entropy coding. Algorithms for designing TSVQs and its variants have been studied extensively. The Gerso and Grey treatise cited above provides a background survey of such algorithms.

In the prior art, mean squared error typically is used as distortion measure, with discrete cosine transforms ("DCT") being followed by scalar quantization. By contrast, the present invention performs DCT after which whole blocks of data are subjected to vector quantization, preferably with a perception model. Subjectively meaningful distortion measures are used in the design and operation of the TSVQ. For this purpose, vector transformation is made using the DCT. Next, the following input-weighted squared error is applied to the transform coefficients:

$$d_T(y, \hat{y}) = \sum_{j=1}^{K} w_j(y_j - \hat{y}_j)^2$$

In the above equation, $y_j$ and $\hat{y}_j$ are the components of the transformed vector y and of the corresponding reproduction vector $\hat{y}$, whereas $w_j$ is a component of the weight vector depending in general on y. Stated differently, distortion is the weighted sum of squared differences between the coefficients of the original transformed vector and the corresponding reproduced vector.

According to the present invention, the weights reflect human visual sensitivity to quantization errors in different transform coefficients, or bands. The weights are input-dependent to model masking effects. When used in the perceptual distortion measure for vector quantization, the weights control an effective stepsize, or bit allocation, for each band. When the transform coefficients are vector quantized with respect to a weighted squared error distortion measure, the role played by weights $w_1, \ldots, w_K$ corresponds to stepsizes in the scalar quantization case. Thus, the perceptual model is incorporated into the VQ distortion measure, rather than into a stepsize or bit allocation algorithm, This permits the weights to vary with the input vector, while permitting the decoder to operate without requiring the encoder to transmit any side information about the weights.

In the first stage of the compression encoder shown in FIG. 2, an image is transformed using DCT. The second stage of the encoder forms a vector of the transformed block. Next, the DCT coefficients are vector quantized using a TSVQ designed with a perceptually meaningful distortion measure. The encoder sends the indices as an embedded stream with different index planes. The first index plane contains the index for the rate 1/k TSVQ codebook. The second index plane contains the additional index which along with the first index plane gives the index for the rate 2/k TSVQ codebook. The remaining index planes similarly have part of the indices for 3/k, 4/k . . . , R/k TSVQ codebooks, respectively.

Such encoding of the indices advantageously produces an embedded prioritized bitstream. Thus, rate or bandwidth scalability is easily achieved by dropping index planes from the embedded bit-stream. At the receiving end, the decoder can use the remaining embedded stream to index a TSVQ codebook of the corresponding rate.

Frame-rate scalability can be easily achieved by dropping frames, as at present no interframe compression is implemented in the preferred embodiment of the encoder algorithm. The algorithm further provides a perceptually prioritized bit-stream because of the embedding property of TSVQ. If desired, motion estimation and/or conditional replenishment may also be incorporated into the system.

Scalable compression according to the present invention is also important for image browsing, multimedia applications, transcoding to different formats, and embedded television standards. By prioritizing packets comprising the embedded stream, congestion due to contention for network bandwidth, central processor unit ("CPU") cycles, etc., in the dynamic environment of general purpose computing systems can be overcome by intelligently dropping less important packets from the transmitted embedded stream.

Information layout on the video disk storage system 90 (see FIG. 1) preferably involves laying the video as two streams, e.g., the base layer and the first and second enhancement layer streams. In practice, it is not necessary to store the error signal for the 640×480 resolution, since fairly good quality video can be provided by bilinear interpolation of the 320×240 resolution images.

The base layer data is stored as a separate stream from the enhancement layer data on disk subsystem 90. This allows the system to admit more users when fewer users choose to receive the enhancement layer data. As will now be described, the base layer data is stored hierarchically, data for each frame being stored together. Each frame has a set of index planes corresponding to different number of bits used for the lookup.

The compressed stream comprises look-up indices with different number of bits depending on the bandwidth and quality requirement. The look-up indices for each frame are stored as groups of index planes pre-formatted with application level headers for network transmission. Preferably the four most significant bits of the lookup indices are stored together as the first section of the frame block. Then four additional 1-bit planes of look-up are stored in sequence, as separate sections of the frame block to provide lookup indices with 4, 5, 6, 7, 8 bits, respectively. The different look-up indices provide data streams with different bandwidth requirements.

With reference to FIG. 1, server 20 fetches the base signal frame block from the disk 90, transmits the selected sections on the network 30, 30'. The re-packing of the bit planes into look-up indices is left to the receiving application at the client-end of the system.

The error data is placed similarly as another data stream. The look-up indices preferably are stored as the most significant two bits of the look-up indices in the first section for each frame block in the bit stream. Then follow the second two bits of the look-up indices as the second section, followed in turn by four additional 1-bit sections of lookup indices that are stored to provide look-up indices with 2, 4, 5, 6, 7, 8 bits, respectively. Other encoding bit patterns might instead be used, however.

Preferably the video server uses RAID-like techniques to stripe each (data stream) across several drives. RAID design techniques are known in the art; e.g., see F. Tobagi, et al., "Streaming RAID—A disk array management system for video files," Proc. ACM Multimedia 1993. A RAID design allows for recovery from failure of any single disk without diminishing the capacity of the server. A RAID design removes any restriction on the number of active users of a given video title, as long as the multiple users can be accommodated within the server total bandwidth. That is, the usage can range from all active users receiving the same title at different offsets to all receiving different streams.

The streams of base and enhancement layer data preferably are striped in fixed size units across the set of drives in the RAID group, with parity placed on an additional drive. The selection of the parity drive is fixed since data updates are quite rare compared to the number of times the streams are read. The preferred striping policy keeps all of the look-up indices for an individual frame together on one disk. This allows for ease of positioning when a user single steps or fast-forwards the user's display, although there is a penalty in some loss of storage capacity due to fragmentation. Use of parity on the stripe level allows for quick recovery after a drive failure at the cost of using substantially more buffer space to hold the full exclusive-OR recovery data set.

In the present invention, the video server utilizes the planar bit stream format directly as the basis for the packet stream in the network layer. The embedded stream bits plus the application packet header are read from disk 90 and are transmitted on the network in exactly the same format. For example, in the preferred embodiment the base video layer has the four most significant bits of the look-up indices stored together. Thus, those bits are transmitted as one 2440 byte packet, and each additional index bit plane of the less significant bits is transmitted as a separate 640 byte packet.

The header preferably contains a frame sequence number, nominal frame rate, size, a virtual time stamp, and a bit plane type specifier sufficient to make each packet an identifiable stand-alone unit. The server uses the self identifying header to extract each bit plane group packet from the striped frame data retrieved from the disk subsystem.

The server also uses the header sequence and rate information as a means to pace the network transmission and disk read requests. The server uses a feedback loop to measure the processing and delivery time costs of the disk reads and queueing the network packets for transmission. The server then uses these measures to schedule the next disk read and packet transmission activities to match the video stream frame rate (i.e., at X milliseconds in the future start transmitting the next frame of video). The server can moderate the transmission rate based on slow down/speed-up feedback from the decoder.

With further reference to FIG. 1, at the receiving end, decoder(s) 40 according to the present invention include a central processing unit ("CPU") 140 that includes a CPU per se and associated memory including cache memory.

Decoder(s) 40 further includes a mechanism 145 for synchronizing audio and video information from the incoming embedded stream, as well as audio and video decoders 150, 160. The output from these decoders is coupled to sound generator, e.g., a speaker, and to video displays 180.

If the decoders are software-based, the decoding process steps preferably are stored in memory, for example memory 140, for execution by the associated CPU. Alternatively, in applications where full CPU operations are not required, for example simple display applications, decoders according to the present invention may be implemented in hardware, e.g., in a simply CPU' and read-only memory ("ROM") unit 155. Within unit 155 is a relatively simple central processor unit CPU' that, collectively with the associated ROM, represents a hardware unit that may be produced for a few dollars.

Target decoder system 40 should be able to define at least 160×120, 320×240, 640×480 pixel spatial resolutions, and at least 1 to 30 frames per second temporal resolution. Decoder system 40 must also accommodate bandwidth scalability with a dynamic range of video data from 10 kbps to 10 kbps to 10 Mbps. According to the present invention, video encoder 60 provides a single embedded stream from which different streams at different spatial and temporal resolutions and different data rates can be extracted by decoders 40, depending on decoder capabilities and requirements. However, as noted, encoder embedding is independent of the characteristics of the decoder(s) that will receive the single embedded information stream.

For example, decoder 40 can include search engines that permit a user to browse material for relevant segments, perhaps news, that the user may then select for full review. Within server 20, video storage 90 migrates the full resolution, full frame rate news stories based on their age and access history from disk to CD ROM to tape, leaving lower resolution versions behind to support the browsing operation. If a news segment becomes more popular or important, the higher resolution can then be retrieved and stored at a more accessible portion of the storage hierarchy 90.

The decoders merely use the indices from the embedded bit-stream to look-up from a codebook that is designed to make efficient use of the cache memory associated with the CPU unit 140. According to the present invention, video stream decoding is straightforward, and consists of loading the codebooks into the CPU cache memory, and performing look-ups from the stored codebook tables. In practice, the codebook may be stored in less than about 12 Kb of cache memory.

As noted, alternatively, unit 155 may include a small, e.g., about 12 Kb ROM, that under control of a simply processor unit CPU' inexpensively provides decoder operations in applications where the full function of a more complex processor (such as the CPU associated with unit 140) are not needed. It is understood from FIG. 1 that a hardware-based (e.g., ROM-based) decoder embodiment would include unit 155 but not unit 140. Video decoder 160 uses a Laplacian pyramid decoding algorithm, and preferably can support up to three spatial resolutions, i.e., 160×120 pixels, 320×240 pixels, and 640×480 pixels. Further, decoder 160 can support any frame rate, as the frames are coded independently by encoder 60.

Figure 3:
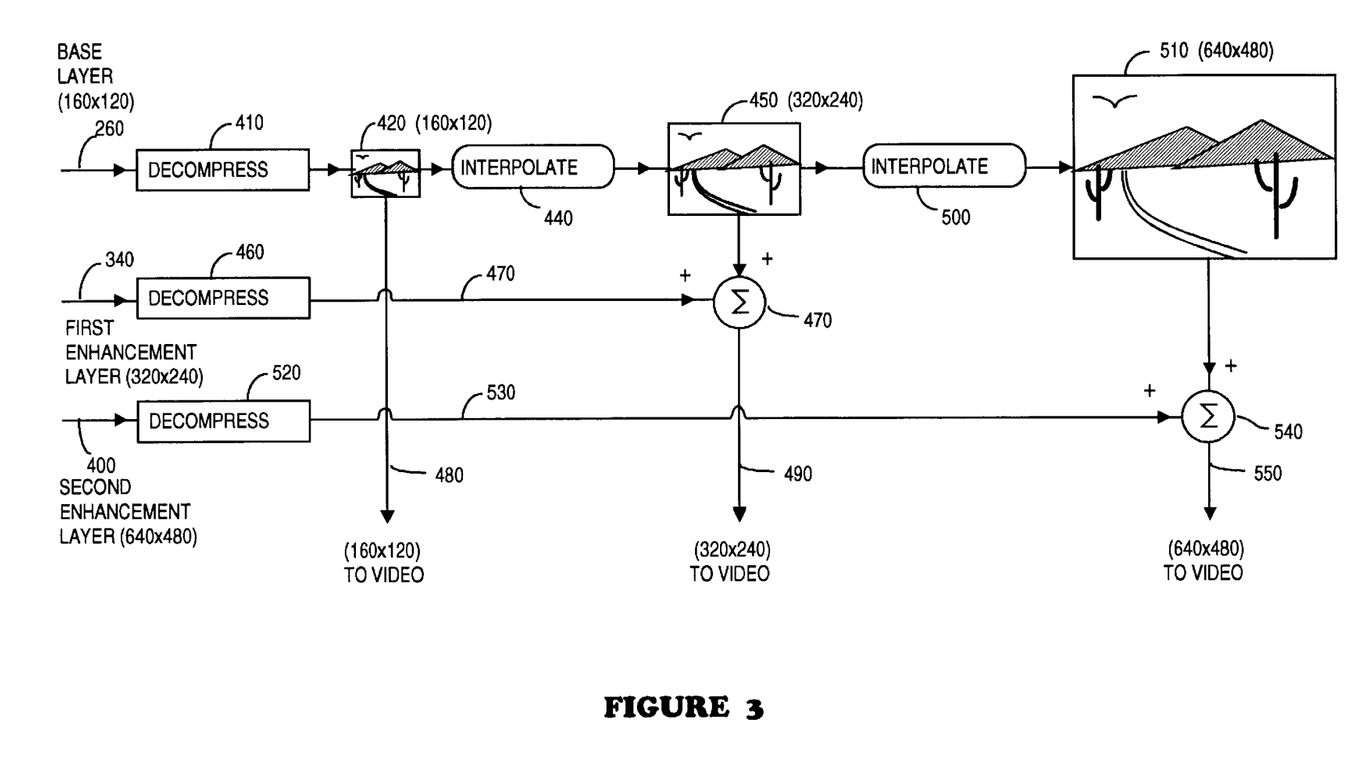
FIG. 3 is a block/flow diagram depicting a decoding technique to recover scalable video from a single embedded video stream, according to the present invention.

The decoding methodology is shown in FIG. 3. To decode a 160×120 pixel image, decoder 160 at method step 410 need only decompress the base layer 160×120 pixel image 260. The resultant image 430 is copied to video monitor (or other device) 180. APPENDIX 1, attached hereto, is a sample of decompression as used with the present invention.

To obtain a 320×240 pixel image, decoder 160 first decompresses (step 410) the base layer 260, and then at step 440 up-samples to yield an image 450 having the correct spatial resolution, e.g., 320×240 pixels. Next, at step 460, the error data in the first enhancement layer 340 is decompressed. The decompressed image 470 is then added at step 480 to up-sampled base image 450. The resultant 320×240 pixel image 490 is coupled by decoder 160 to a suitable display mechanism 180.

To obtain a 640×480 pixel image, the up-sampled 320×240 pixel image 450 is up-sampled at step 500 to yield an image 510 having the correct spatial resolution, e.g., 640×480 pixels. Next, at step 520, the error data in the second enhancement layer 400 is decompressed. The decompressed image 530 is added at step 540 to the up-sampled base image 510. The resultant 640×480 pixel image 550 is coupled by decoder 160 to a suitable display mechanism 180.

As seen from FIG. 3 and the above-description, it will be appreciated that obtaining the base layer from the embedded bit stream requires only look-ups, whereas obtaining the enhancement layers involves performing look-ups of the base and error images, followed by an addition process. The decoder is software-based and operates rapidly in that all decoder operations are actually performed beforehand, i.e., by preprocessing. The TSVQ decoder codebook contains the inverse DCT performed on the codewords of the encoder codebook.

Thus, at the decoder there is no need for performing inverse block transforms. Color conversion, i.e., Yuv to RGB, is also performed as a pre-processing step by storing the corresponding color converted codebook. To display video on a limited color palette display, the resulting codewords of the decoder codebook are quantized using a color quantization algorithm. One such algorithm has been proposed by applicant Chaddha et al., "Fast Vector Quantization Algorithms for Color Palette Design Based on Human Vision Perception," accepted for publication IEEE Transactions on Image Processing.

According to the present invention, color conversion involves forming a RGB or YUV color vector from the codebook codewords, which are then color quantizing to the required alphabet size. Thus, the same embedded index stream can be used for displaying images on different alphabet decoders that have the appropriate codebooks with the correct alphabet size, e.g., 1-bit to 24-bit color.

On the receiving end, the video decoder 40, 40' is responsible for reassembly of the lookup indices from the packets received from the network. If one of the less significant index bit plane packets is somehow lost, the decoder uses the more significant bits to construct a shorter look-up table index. This yields a lower quality but still recognizable image.

The use of separately identified packets containing index bit planes makes it possible for networks to easily scale the video as a side effect of dropping less important packets. In networks providing QOS qualifiers such as ATM, multiple circuits can be used to indicate the order in which packets should be dropped (i.e., the least significant bit plane packets first). In an IP router environment, packet filters can be constructed to appropriately discard less important packets. For prioritized networks, the base layer will be sent on the high priority channel while the enhancement layer will be sent on the low priority channel. To provide error resiliency, using a fixed-rate coding scheme with some added redundancy allows robustness in the event of packet loss.

It will be appreciated that a server according to the present invention can support two usage scenarios: point-to-point demand (e.g., networks 30', decoders 40' in FIG. 1), or multicast (e.g., network cloud 50, networks 30, decoders 40 in FIG. 1).

In a point-to-point demand environment, each destination system decoder presents its specific requirements to the server. The server then sends the selected elements of the embedded stream across the network to the destination. A separate network stream per destination allows the user to have VCR style functionality such as play/stop/rewind fast forward/fast reverse. If congestion occurs on the network, the routers and switches can intelligently drop packets from the embedded stream to give a lesser number of lookup bits.

In a multicast environment, the server, which has no information about the destination decoders, outputs the entire embedded stream for the different resolutions and rates onto the network as a set of trees. In the preferred embodiment, there may be one to eleven trees, depending on the granularity of traffic control desired. The primary traffic management is performed during the construction of the unicast trees, by not adding branches of the trees carrying the less important bit streams to the lower bandwidth networks. The network in this case takes care of bandwidth mismatches by not forwarding packets to the networks which are not subscribed to a particular tree. Switches and routers can still react to temporary congestion by intelligently dropping packets from the embedded stream to deliver fewer bits of look-up.

The delivery system treats the audio track as a separate stream that is stored on disk 100 and transmitted across the network as a separate entity. The audio format supports multiple data formats from 8 KHz telephony quality (8 bit mu-law) to 48 KHz stereo quality audio (2 channel, 16 bit linear samples). In practice, many video clips may have 8 KHz telephone audio, to permit material distribution over medium-to-low bandwidth networks. The server can store separate high and low quality audio tracks, and transmit the audio track selected by the user. As the audio transits the network on a separate circuit, the audio can easily be given a higher QOS than the video streams. Rather than further load the networks with duplicate audio packets, as is known in the prior art, in the present invention the audio is ramped down to silence when packets are overly delayed or lost.

As the audio and video are delivered via independent mechanisms to the decoding system, the two streams must be synchronized by mechanism 145 for final presentation to the user. At the decoder, the receiving threads communicate through the use of a shared memory region, into which the sequence information of the current audio and video display units are written.

The human perceptual system is more sensitive to audio dropouts than to video drops, and audio is more difficult than video to temporarily reprocess. Thus, the decoder preferably uses the audio coder as the master clock for synchronization purposes. As the streams progress, the decoder threads post the current data items' sequence information onto a "blackboard" or scratchpad portion of memory associated with CPU unit 140. The slave threads (such as the video decoder) use the posted sequence information of the audio stream to determine when their data element should be displayed. The slave threads then delay until the appropriate time if the slave is early (e.g., more than 80 milliseconds ahead of the audio). If the slave data is too late (e.g., more than 20 milliseconds behind the audio), then it is discarded on the assumption that continuing to process late data will delay more timely data.

The video decoder can optionally measure the deviation from the desired data delay rate and send speed-up and slow-down indications back to the video server. This process synchronizes streams whose elements arrive in a timely fashion and does not allow a slow stream to impede the progress of the other streams.

In the even of scarcity of resources, some global prioritization of user requests must take place to guard against overload collapse. In a practical system, payment for services and resources may be used to define the overall value of each resource allocation decision. Given these values, a total ordering of the user requests can be made, e.g., by admission control 110, and the less important requests can be dropped. The user specifies what he or she is willing to pay for a given service. This proposed amount and the required associated resources (network and disk bandwidth) are submitted to an electronic market, e.g., admission control 110, which uses micro-economic models to decide what amount of bandwidth resource is available to the user. Such techniques are known in the art, e.g., M. Miller, "Extending markets inward," Bionomics Conference, San Francisco, Calif. (October 1994).

For the particular bandwidth required, a table is indexed to find the best possible combination of spatial resolution, frame rate and data rate (number of bits of look-up to be used) to give the best quality of decompressed video. Preferably such table is built using a subjective distortion measure, such as described by N. Chaddha and T. H. Y. Meng, "Psycho-visual based distortion measures for image and video compression", Proc. of Asilomar Conference on Signals, Systems and Computers, November 1993. Preferably, the user also has the option of specifying the spatial resolution, frame rate and bandwidth directly.

It will be appreciated that the described overall system combines a software-based encoder with an encoding compression algorithm, disk management, network transport, software-based decoder, and synchronization mechanism to provide an end-to-end scalable video delivery service. The service may be divided into three groups of components, comprising preprocessing, media server, and media player.

The processing components include audio capture, video capture, video compression, and a data stripping tool. The video is captured and digitized using single step VCR devices. Each frame is then compressed off-line (non-real time) using the encoding algorithm. At present, it takes about one second on a SparcStation 20 Workstation to compress a frame of video data, and single step VCR devices can step at a one frame per second rate permitting overlap of capture and compression.

The audio data preferably is captured as a single pass over the tape. The audio and video time stamps and sequence numbers are aligned by the data striping tool as the video is stored to facilitate later media synchronization. The audio and video data preferably are striped onto the disks with a user-selected stripe size. In a preferred embodiment, all of the video data on the server uses a 48 kilobyte stripe size, as 48 kilobytes per disk transfer provides good utilization at peak load with approximately 50% of the disk bandwidth delivering data to the media server components.

The media server components include a session control agent, the audio transmission agent, and the video transmission agent. The user connects to the session control agent on the server system and arranges to pay for the video service and network bandwidth. The user can specify the cost he/she is willing to pay and an appropriately scaled stream will be provided by the server. The session control agent (e.g., admission control mechanism 110) then sets up the network delivery connections and starts the video and audio transmission agents. The session control agent 110 is the single point of entry for control operations from the consumers remote control, the network management system, and the electronic market.

The audio and video transmission agents read the media data from the striped disks and pace the transmission of the data onto the network. The video transmission agent scales the embedded bit-stream in real-time by transmitting only the bit planes needed to reconstruct the selected resolution at the decoder. For example, a 320×240 stream with 8 bits of base, 4 bits of enhancement signal at 15 frames per second will transmit every other frame of video data with all 5 packets for each frame of the base and only two packets containing the four most significant bits of the enhancement layer resulting in 864 Kb of network utilization. The server sends the video and audio either for a point-to-point situation or a multicast situation.

The media player components are the software-based or ROM-based video decoder 40, 40', the audio receiver, and a user interface agent. The decoder receives the data from the network and decodes it using look-up tables and places the results onto the frame buffer. The decoder can run on any modern microprocessor unit without the CPU loading significantly. The audio receiver loops reading data from the network and queuues the data for output to the speaker. In the event of audio packet loss, the audio receiver preferably ramps the audio level down to silence level and then back up to the nominal audio level of the next successfully received audio packet. The system performs media synchronization to align the audio and video streams at the destination, using techniques such as described by J. D. Northcutt and E. M. Kuerner, "System Support for Time-Critical applications," Proc. NOSSDAV' 91, Germany, pp 242–254.

End-to-end feedback is used in the on demand case to control the flow. In the multicast case, the destinations are slaved to the flow from the server with no feedback. The user interface agent serves as the control connection to the session agent on the media server passing flow control feedback as well as the user's start/stop controls. The user can specify the cost he or she is willing to pay and an appropriate stream will be provided by the system.

A prototype system according to the present invention uses a video data rate that varies from 19.2 kbps to 2 Mbps depending on the spatial and temporal requirement of the decoder and the network bandwidth available. The PSNR varies between 31.63 dB to 37.5 dB. Table 1 gives the results for the decoding of a 160×120 resolution video on a SparcStation 20. It can be seen from Table 1 that the time required to get the highest quality stream (8-bit index) at 160×120 resolution is 2.45 ms per frame (sum of lookup and packing time). This corresponds to a potential frame rate of 400 frames/sec.

TABLE 1

RESULTS FOR 160x120 RESOLUTION (DECODER)

| No. of Bits of Lookup | PSNR (dB) | Bandwidth as a function of fame rate (N) Kbps | CPU time per frame (ms) | Packing time per frame (ms) |
|---|---|---|---|---|
| 4 | 31.63 dB | 19.2N | 1.24 ms | 0 ms |
| 5 | 32.50 dB | 24N | 1.32 ms | 0.52 ms |
| 6 | 34 dB | 28.8N | 1.26 ms | 0.80 ms |
| 7 | 35.8 dB | 33.6N | 1.10 ms | 1.09 ms |
| 8 | 37.2 dB | 38.4N | 1.18 ms | 1.27 ms |

Similarly, Table 2 gives the results for the decoding of a 320×240 resolution video on a Sparcstation 20. It can be seen from Table 2 that the time required to get the highest quality stream (8-bit base index and 8-bit first enhancement layer index) at 320×240 resolution is 7.76 ms per frame (sum of look-up and packing time). This corresponds to a potential frame rate of 130 frames/sec.

TABLE 2

RESULTS FOR 320x240 RESOLUTION (8 BIT-LOOKUP BASE)

| No. of Bits of Lookup | PSNR (dB) | Bandwidth as a function of frame rate (N) Kbps | CPU time per frame (ms) | Packing time per frame (ms) |
|---|---|---|---|---|
| 2 | 33.72 dB | 48N | 6.01 ms | 0.385 ms |
| 4 | 35.0 dB | 52.8N | 6.04 ms | 0.645 ms |
| 5 | 35.65 dB | 62.4N | 6.05 ms | 0.92 ms |
| 6 | 36.26 dB | 67.2N | 6.08 ms | 1.20 ms |
| 7 | 36.9 dB | 72N | 6.04 ms | 1.48 ms |
| 8 | 37.5 dB | 76.8N | 6.09 ms | 1.67 ms |

Table 3 gives the results for the decoding of a 640×480 resolution video again on a SparcStation 20. It can be seen from Table 3 that the time required to get the highest quality stream (8-bit base and 8-bit enhancement layer) at 640×480 resolution is 24.62 ms per frame (sum of lookup and packing time). This corresponds to a potential frame rate of 40 frames/sec.

TABLE 3

RESULTS FOR 640x480 WITH 320X240 INTERPOLATED

| No. of Bits of Lookup | PSNR (dB) | Bandwidth as a function of frame rate (N) Kbps | CPU time per frame (ms) | Packing time per fame (ms) |
|---|---|---|---|---|
| 2 | 33.2 dB | 48N | 22.8 ms | 0.385 ms |
| 4 | 34 dB | 52.8N | 22.87 ms | 0.645 ms |
| 5 | 34.34 dB | 62.4N | 23.14 ms | 0.92 ms |
| 6 | 34.71 dB | 67.2N | 22.93 ms | 1.20 ms |
| 7 | 35.07 dB | 72N | 22.90 ms | 1.48 ms |
| 8 | 35.34 dB | 76.8N | 22.95 ms | 1.67 ms |

Table 4 shows the results for each individual disk for 160×120 resolution video. It can be seen that to get the highest quality stream (8-bit base) at 160×120 requires 5.60 ms of CPU time and an average CPU load of 2% on a SparcStation 20 workstation. The average disk access time per frame is 16 ms.

TABLE 4

RESULTS FOR 160x120 AT THE DISK SERVER

| No. of Bits of Lookup | Bandwidth as a function of frame rate (N) Kbps | CPU time per frame (ms) | Seek-time (ms) | Avg. CPU Load |
|---|---|---|---|---|
| 4 | 19.2N | 2.84 ms | 16 ms | 1% |
| 5 | 24N | 3.67 ms | 16 ms | 1% |
| 6 | 28.8N | 4.48 ms | 14 ms | 2% |
| 7 | 33.6N | 4.92 ms | 14 ms | 2% |
| 8 | 38.4N | 5.60 ms | 16 ms | 2% |

Similarly, Table 5 shows the results for each individual disk for 320×240 resolution video. It can be seen that obtaining the highest quality stream (8-bit base and 8-bit enhancement layer) at 320×240 requires 12.73 ms of CPU time and an average CPU load of 7% on a SparcStation workstation. The average disk access time per frame is 18 ms.

TABLE 5

RESULTS FOR 320x240 AT THE DISK SERVER

| No. of Bits of Lookup | Bandwidth as a function of frame rate (N) Kbps | CPU time per frame (ms) | Seek-time (ms) | Avg. CPU Load |
|---|---|---|---|---|
| 2 | 48N | 10.47 ms | 18 ms | 6% |
| 4 | 52.8N | 11.02 ms | 16 ms | 6% |
| 5 | 62.4N | 11.55 ms | 18 ms | 6% |
| 6 | 67.2N | 12.29 ms | 20 ms | 7% |
| 7 | 72N | 12.55 ms | 20 ms | 7% |
| 8 | 76.8N | 12.73 ms | 18 ms | 7% |

Modifications and variations may be made to the disclosed embodiments without departing from the subject and spirit of the invention as defined by the following claims.

What is claimed is:

1. A decoder that receives a network-transmittable server generated single embedded bit stream in pixel blocks that contains information for at least two spatial resolutions of video, said server encoding said embedded bit stream using discrete cosine transformation followed by tree-structured quantization, said decoder outputting from said bit stream scaleable video that is variable in at least one of spatial resolution, temporal resolution, and data rate, the decoder including:
   a central processor unit coupled to a memory unit;
   a look-up table, stored in said memory unit, including preprocessed decoded versions of quantized indexable representations of inverse discrete cosine transforms of image data used when codewords present in said embedded bit stream were created; and
   a processor controlled by said central processor unit that processes said information contained in said embedded bit stream and decodes at least a first spatial resolution image by decompressing base layer data contained within said embedded bit stream;
   wherein said decoder can decode a viewable image from data in said embedded bit stream from received codewords containing less than a number of bits representing a full-length codeword.

2. The decoder of claim 1, wherein said processor further decodes a second, higher, spatial resolution image by decompressing said base layer data to obtain a first intermediate image that is up-sampled to yield a first up-sampled image to which is added decompressed error data in a first enhancement layer contained in said embedded bit stream.

3. The decoder of claim 2, wherein said embedded bit stream contains at least three spatial resolutions, and wherein said processor further decodes a third image whose spatial resolution is higher than said second image by up-sampling said first up-sampled image to yield a second intermediate image to which is added decompressed error data in a second enhancement layer contained in said embedded bit stream.

4. The decoder of claim 2, wherein said memory unit stores at least one of the following (i) an algorithm used to carry-out said decoding, (ii) look-up data used in decompressing said base layer data, (iii) look-up data associated with said error data in said first enhancement layer, (iv) preprocessed data representing up-sampling of said first up-sampled image, and (v) preprocessed data associated with said error data in said second enhancement layer.

5. The decoder of claim 2, wherein said tree-structured vector quantization has a tree depth R and a vector dimension k;
   wherein bitstream bit rates O/k . . . , R/k are provided for said embedded bit stream.

6. The decoder of claim 5, wherein said memory unit stores codewords arranged in a tree structure.

7. The decoder of claim 1, wherein said server encodes spatial resolution data in said embedded bit stream in pixel blocks, wherein:
   said decoder provides error correction for said embedded bit stream using inverse vector quantization followed by inverse discrete cosine transformation of at least some of said pixel blocks, said inverse vector quantization and said inverse discrete cosine transformation being preprocessed and stored in said memory unit.

8. The decoder of claim 1, wherein said vector quantization includes human perception modelling.

9. The decoder of claim 1, wherein said memory unit stores codewords arranged in a tree structure.

10. The decoder of claim 2, wherein:
   said first image has 160×120 pixel resolution, said second image has 320×240 pixel resolution, and wherein said third image has 640×480 pixel resolution.

11. The decoder of claim 2, wherein:
   said processor decodes a 160×120 pixel image by decompressing base layer data contained within said embedded bit stream;
   said processor decodes a 320×240 pixel image by decompressing said base layer data to obtain a first intermediate image and up-samples said first intermediate image to yield a first up-sampled image to which is added decompressed error data in a first enhancement layer contained in said embedded bit stream; and
   said processor decodes a 640×480 pixel image by up-sampling said first up-sampled image to yield a second intermediate image to which is added decompressed error data in a second enhancement layer contained in said embedded bit stream.

12. A hardware-based decoder for use with a video delivery system whose server encodes an embedded bit stream in pixel blocks using discrete cosine transformation followed by tree-structured quantization, said embedded bit stream including information for at least two spatial resolutions and transmittable over at least one network, the decoder including:
   a central processor unit coupled to a memory unit including a read-only memory storing preprocessed decoded versions of quantized indexable representations of inverse discrete cosine transforms of image data used by said server to create codewords present in said embedded bit stream;
   said preprocessed decoded versions including at least information used to decode a first spatial resolution image by decompressing base layer data contained within said embedded bit stream;
   wherein said decoder can decode a viewable image from data in said embedded bit stream from received codewords containing less than a number of bits representing a full-length codeword.

13. The decoder of claim 1 wherein said preprocessed decoded versions further include information used to decode a second, higher, spatial resolution image by decompressing said base layer data to obtain a first intermediate image that is up-sampled to yield a first up-sampled image to which is added decompressed error data in a first enhancement layer contained in said embedded bit stream.

14. The decoder of claim 12, wherein said embedded bit stream contains at least three spatial resolutions, and wherein said preprocessed decoded versions further include information used to decode a third spatial resolution image, whose spatial resolution is higher than said second image, by up-sampling said first up-sampled image to yield a second intermediate image to which is added decompressed error data in a second enhancement layer contained in said embedded bit stream.

15. The decoder of claim 14, wherein said memory unit stores at least one of the following (i) an algorithm used to carry-out said decoding, (ii) look-up data used in decompressing said base layer data, (iii) look-up data associated with said error data in said first enhancement layer, (iv) preprocessed data representing up-sampling of said first up-sampled image, and (v) preprocessed data associated with said error data in said second enhancement layer.

16. The decoder of claim 12, wherein said tree-structured vector quantization has a tree depth R and a vector dimension k;

wherein bitstream bit rates O/k . . . , R/k are provided for said embedded bit stream.

17. The decoder of claim 12, wherein said read-only memory stores codewords arranged in a tree structure.

18. The decoder of claim 12, wherein said vector quantization includes human perception modelling.

19. The decoder of claim 12, wherein:

said server encodes spatial resolution data in said embedded bit stream in pixel blocks; and wherein:

said decoder provides error correction for said embedded bit stream using inverse vector quantization followed by inverse discrete cosine transformation of at least some of said pixel blocks, said inverse vector quantization and said inverse discrete cosine transformation being preprocessed and stored in said memory unit.

20. A method of decoding information embedded by a video server in an embedded bit stream having pixel blocks that include information for at least two spatial resolutions, said embedded bit stream being encoded by said server using discrete cosine transformation followed by tree-structured quantization, the method including the following steps:

(a) providing a stored set of preprocessed decoded versions of quantized indexable representations of inverse discrete cosine transforms of image data used by said server in creating codewords present in said embedded bit stream;

(b) processing said embedded bit stream to use information contained therein to index into said stored set of preprocessed decoded versions to decode at least one of:

(i) a first spatial resolution image by decompressing base layer data contained within said embedded bit stream;

(ii) a second, higher, spatial resolution image by decompressing said base layer data to obtain a first intermediate image and up-sampling said first intermediate image to yield a first up-sampled image to which is added decompressed error data in a first enhancement layer contained in said embedded bit stream; and (iii) if said bit stream contains at least three spatial resolutions, a third image whose spatial resolution is higher than said second image by up-sam-pling said first up-sampled image to yield a second intermediate image to which is added decompressed error data in a second enhancement layer contained in said embedded bit stream;

wherein said a viewable image is decodable by said decoder from codewords received in said embedded bit stream that contain less than a number of bits representing a full-length codeword.

\* \* \* \* \*